(12) United States Patent
Kasubata et al.

(10) Patent No.: US 9,468,984 B2
(45) Date of Patent: Oct. 18, 2016

(54) BROACHING DEVICE

(75) Inventors: Yoshitake Kasubata, Tokyo (JP); Yoshihiko Higashiguchi, Tokyo (JP); Yuichi Sasaki, Tokyo (JP); Akio Kambe, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 825 days.

(21) Appl. No.: 13/882,038

(22) PCT Filed: Dec. 12, 2011

(86) PCT No.: PCT/JP2011/078718
§ 371 (c)(1),
(2), (4) Date: Apr. 26, 2013

(87) PCT Pub. No.: WO2012/086446
PCT Pub. Date: Jun. 28, 2012

(65) Prior Publication Data
US 2013/0223947 A1    Aug. 29, 2013

(30) Foreign Application Priority Data
Dec. 22, 2010    (JP) .................................. 2010-286705

(51) Int. Cl.
*B23D 37/02* (2006.01)
*B23Q 3/155* (2006.01)
(Continued)

(52) U.S. Cl.
CPC .............. *B23D 37/02* (2013.01); *B23D 37/04* (2013.01); *B23D 41/04* (2013.01); *B23D 41/06* (2013.01);
(Continued)

(58) Field of Classification Search
CPC ...... B23D 37/02; B23D 37/04; B23D 37/06; B23D 41/04; B23D 41/06; B23D 41/08; B23D 41/086; Y10T 409/400175; Y10T 409/40035; Y10T 409/400525; Y10T 409/403675; Y10T 409/40385; Y10T 409/404025; Y10T 409/4042; Y10T 409/404375; Y10T 409/406475; Y10T 409/40665; Y10T 409/406825; Y10T 409/407; Y10T 409/407175; Y10T 409/40735; Y10T 483/136; Y10T 483/1729; Y10T 483/1731; B23Q 3/155; B23Q 3/157
USPC ....... 409/244, 245, 246, 264, 265, 266, 267, 409/268, 280, 281, 282, 283, 284, 285; 29/564, 564.1, 564.2, 564.7; 483/10, 483/28, 29, 1
See application file for complete search history.

(56) References Cited

U.S. PATENT DOCUMENTS 4,181,458 A * 1/1980 Roturier ................. B23D 37/20
409/265

(Continued)

FOREIGN PATENT DOCUMENTS

DE    10336158 A1 * 2/2005 ............ B23D 41/08
JP    57-054021 A    3/1982

(Continued)

OTHER PUBLICATIONS

Intenational Search Report for PCT/JP2011/078718, Mailing Date of Jan. 17, 2012.

(Continued)

*Primary Examiner* — Sunil K Singh
*Assistant Examiner* — Michael Vitale
(74) *Attorney, Agent, or Firm* — Westerman, Hattori, Daniels & Adrian, LLP

(57) ABSTRACT

A broaching device is provided with puller heads (132,134) that hold tip portions of broaches (116) and are supported in a horizontally freely movable manner, main motors (136, 140) capable of moving the puller heads (132, 134), retriever heads (133,135) that hold base end portions of the broaches (116) and are supported in a horizontally freely movable manner, sub motors (138,142) capable of moving the retriever heads (133,135), and a control device (117) that enables the puller heads (132,134) and the retriever heads (133, 135) to be synchronized with each other and to move at a fixed speed by controlling the motors (136,138,140, 142), whereby machining accuracy can be improved.

9 Claims, 14 Drawing Sheets

(51) Int. Cl.
*B23D 37/04* (2006.01)
*B23D 41/06* (2006.01)
*B23D 41/04* (2006.01)
*B23D 41/08* (2006.01)

(52) U.S. Cl.
CPC ............ B23D 41/086 (2013.01); B23Q 3/155 (2013.01); *Y10T 409/40035* (2015.01); *Y10T 409/400175* (2015.01); *Y10T 409/40665* (2015.01); *Y10T 409/404375* (2015.01); *Y10T 483/10* (2015.01); *Y10T 483/136* (2015.01); *Y10T 483/1729* (2015.01)

(56) References Cited

U.S. PATENT DOCUMENTS 4,367,992 A * 1/1983 Soroka ................... B23D 37/20
 409/264
5,184,927 A * 2/1993 Judy ......................... B23C 3/30
 409/143
5,609,450 A * 3/1997 Beraudier .............. B23D 37/20
 409/244
6,183,404 B1 * 2/2001 Deufel ................... B23Q 3/157
 483/1

FOREIGN PATENT DOCUMENTS

JP 57-138514 A 8/1982
JP 62-027925 B2 6/1987

OTHER PUBLICATIONS

Written Opinion for PCT/JP2011/078718, Maling Date of Jan. 17, 2012.
Translation of Written Opinion dated Jan. 17, 2012, issued in corresponding International Application No. PCT/JP2011/078718.

* cited by examiner

BROACHING DEVICE

FIELD

The present invention relates to a broaching device that forms a hole having a predetermined shape in a tube support plate and the like for supporting a heat transfer tube in a steam generator used as a heat exchanger in a nuclear power plant.

BACKGROUND

For example, a pressurized water reactor (PWR) uses light water as a reactor coolant and a neutron moderator, fills an entire reactor core with not-boiled, high-temperature and high-pressure water, transfers the high-temperature and high-pressure water to a steam generator to generate steam by heat exchange, and transfers the steam to a turbine generator to generate power. Further, the pressurized water reactor transfers heat of high-temperature and high-pressure primary cooling water to secondary cooling water by a steam generator, and generates water vapor with the secondary cooling water. The steam generator has the primary cooling water flowing inside a plurality of narrow transfer tubes, and transfers the heat to the secondary cooling water flowing outside to generate the water vapor, and rotates a turbine with the water vapor to generate power.

In the steam generator, a tube bundle shroud is disposed in a trunk body having a hollow sealed shape with a predetermined interval with an inner wall surface of the trunk body, a plurality of inversely U-shaped heat transfer tubes is disposed in the tube bundle shroud, an end portion of each of the heat transfer tubes is supported by a tube plate, and an inlet-side channel head and an outlet-side channel head of the primary cooling water is formed in a lower end portion of the trunk body. Further, the trunk body is provided with an inlet portion of the secondary cooling water positioned above the tube bundle shroud, the steam-water separator and the moisture separator aligned and disposed up and down, and a steam outlet above the steam-water separator and the moisture separator.

Therefore, the primary cooling water is supplied to the plurality of heat transfer tubes through the inlet-side channel head from a cooling water pipe, while the secondary cooling water is supplied from the inlet portion to the trunk body. Heat exchange is then performed between the primary cooling water (hot water) flowing in the plurality of heat transfer tubes and the secondary cooling water (cool water) circulating in the trunk body, so that the secondary cooling water absorbs heat and water vapor is generated. Water in the generated steam is then removed by the steam-water separator, and the steam from which moisture is removed by the moisture separator is discharged from the steam outlet, while the primary cooling water after completion of the heat exchange is discharged from the outlet-side channel head.

In such a steam generator, the plurality of heat transfer tubes provided in the trunk body is supported by a plurality of tube support plates and a tube plate. The plurality of heat transfer tubes is supported not to vibrate by being inserted into a plurality of holes formed in the tube support plates. In this case, the holes in the tube support plates do not have a circular shape but have a particular shape to form a gap through which steam is distributed between the holes and the heat transfer tubes held by the holes, and are typically machined by a broaching machine. Such a broaching machine is, for example, one disclosed in Patent Literature 1 described below.

CITATION LIST

Patent Literature

Patent Literature 1: Japanese Laid-open Patent Publication No. 62-027925

SUMMARY

Technical Problem

In machining by the broaching machine, an inner surface of a prepared hole is subjected to cutting by a broach by moving the broach in a longitudinal direction, and the cutting resistance fluctuates from hour to hour. In the above-described conventional broaching machine, puller heads and retriever heads are respectively moved by hydraulic cylinders. Therefore, when the cutting resistance fluctuates at the time of cutting by the movement of the broach, it becomes difficult to move the broach at a fixed speed, the broach vibrates and a cutting surface is deteriorated, and highly precise machining becomes difficult.

The present invention solves the above-described problem, and an object of the present invention is to provide a broaching device capable of improving machining accuracy.

Solution to Problem

According to an aspect of the present invention, a broaching device includes: a puller head adapted to hold a tip portion of a broach, and supported in a horizontally movable manner; a first electric motor capable of moving the puller head; a retriever head adapted to hold a base end portion of the broach, and supported in a horizontally movable manner; a second electric motor capable of moving the retriever head; and a control device adapted to enable the puller head and the retriever head to be synchronized with each other and to move at a fixed speed by controlling the first electric motor and the second electric motor.

Therefore, the control device controls the first electric motor and the second electric motor, and causes the puller head and the retriever head to be synchronized with each other and to move at a fixed speed, whereby the puller head and the retriever head can move the held broach at a fixed speed and broaching with respect to a member to be machined can be performed, and the machining accuracy can be improved.

Advantageously, the broaching device further includes a first rotation speed sensor adapted to detect a rotation speed of the first electric motor and a second rotation speed sensor adapted to detect a rotation speed of the second electric motor. The control device controls the rotation speeds of the first electric motor and the second electric motor to be a fixed rotation speed based on a detection result of the first rotation speed sensor and the second rotation speed sensor.

Therefore, the control device enables the puller head and the retriever head to be synchronized with each other and to move at a fixed speed with a simple structure by controlling each of the electric motors based on a detection result of each of the rotation speed sensors.

Advantageously, in the broaching device, when holding of the broach by the retriever head is released at a predetermined machining stage by the broach associated with movement of the puller head and the retriever head, the control device stops the movement of the retriever head by controlling the second electric motor.

Therefore, when the broaching proceeds to a predetermined machining stage by the movement of the broach, the holding of the broach by the retriever head is released and the movement is stopped, resulting in only the puller head moving the broach to perform the machining, and proper broaching with respect to a prepared hole can be performed.

Advantageously, the broaching device further includes a clamp device adapted to support a member to be machined between the puller head and the retriever head. The clamp device includes a pair of upper and lower support members adapted to support an upper portion and a lower portion of prepared holes machined by the broach from one side of the member to be machined, and a pair of upper and lower support pins adapted to be inserted into and support prepared holes at the upper portion and the lower portion of prepared holes machined by the broach from the other side of the member to be machined.

Therefore, the upper portion and the lower portion of the prepared holes to be machined by the broach are supported by the support member and the support pin, whereby stable broaching with respect to the member to be machined becomes possible, and the machining accuracy can be improved.

Advantageously, in the broaching device, a first puller head and a first retriever head are arranged on a straight line, a second puller head and a second retriever head are arranged on a straight line, the second retriever head is arranged adjacent to the first puller head, a broach moving device capable of delivering the broach between the first puller head and the second puller head by turning the broach by 180 degrees in a horizontal direction is provided, and the broach moving device includes a holding claw capable of holding the broach and a broach detection sensor adapted to detect holding of the broach by the holding claw.

Therefore, when the broach moving device delivers the broach between the first puller head and the second puller head, the broach detection sensor detects the holding of the broach by the holding claw, and proper delivery of the broach by the broach moving device can be grasped on a steady basis.

Advantageous Effects of Invention

According to a broaching device of the present invention, a control device is provided, which controls a first electric motor that moves a puller head and a second electric motor that moves a retriever head, and enables the puller head and the retriever head to be synchronized with each other and to move at a fixed speed, whereby the machining accuracy can be improved.

DESCRIPTION OF EMBODIMENTS

Hereinafter, preferred embodiments of a broaching device of the present invention will be described in detail with reference to the appended drawings. Note that the present invention is not limited by the embodiments, and includes one constructed by combining the embodiments if there is a plurality of embodiments.

[Embodiments]

Figure 1:
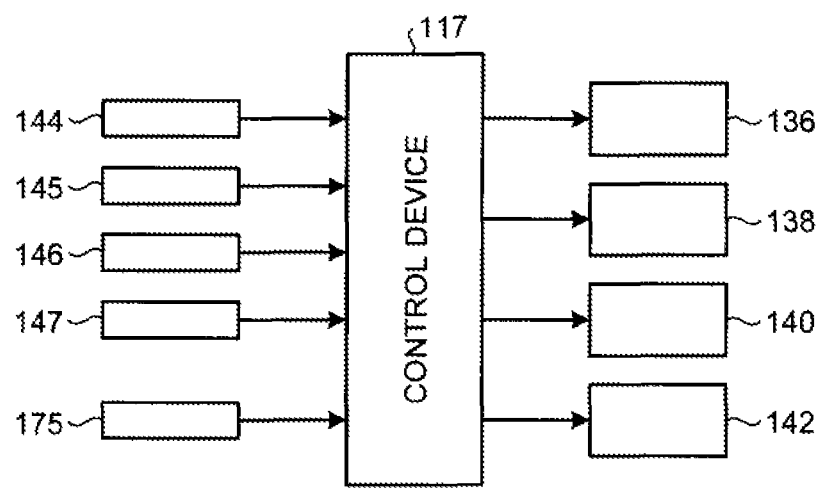
FIG. 1 is a control block diagram of a broaching device according to an embodiment of the present invention.
Figure 2:
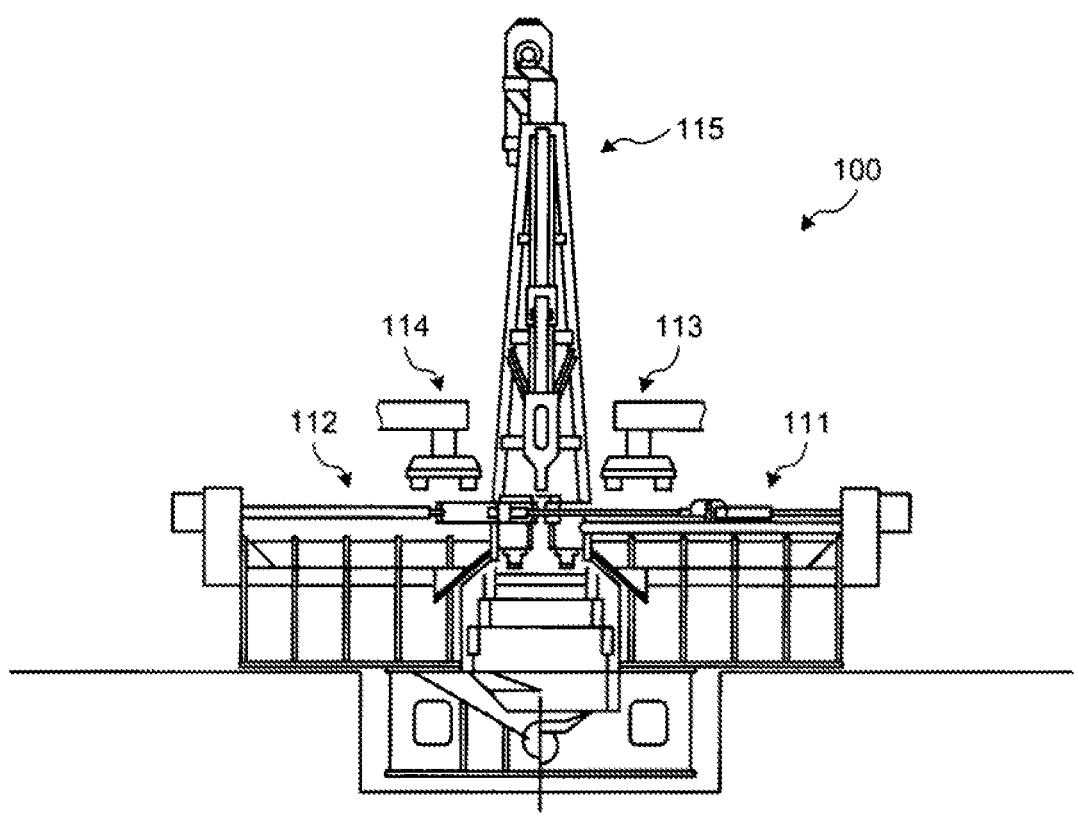
FIG. 2 is a front view of the broaching device of the present embodiment.
Figure 3:
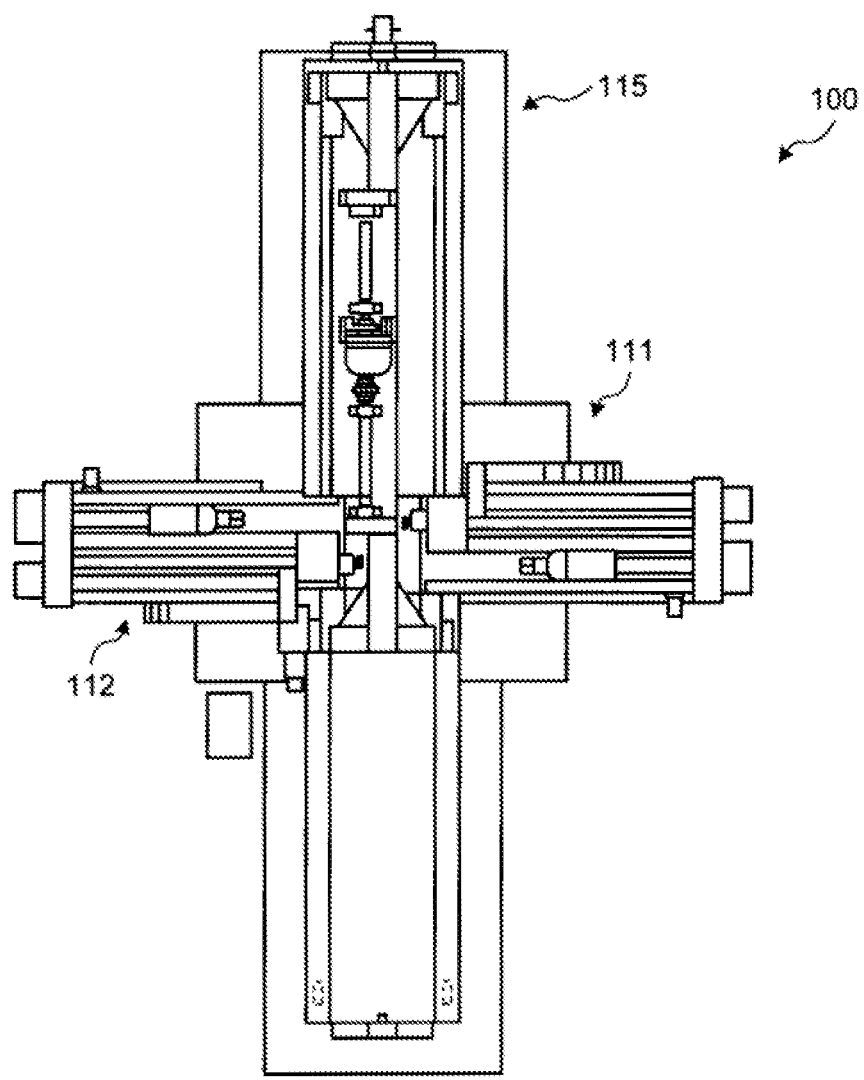
FIG. 3 is a plan view of the broaching device of the present embodiment.
Figure 4:
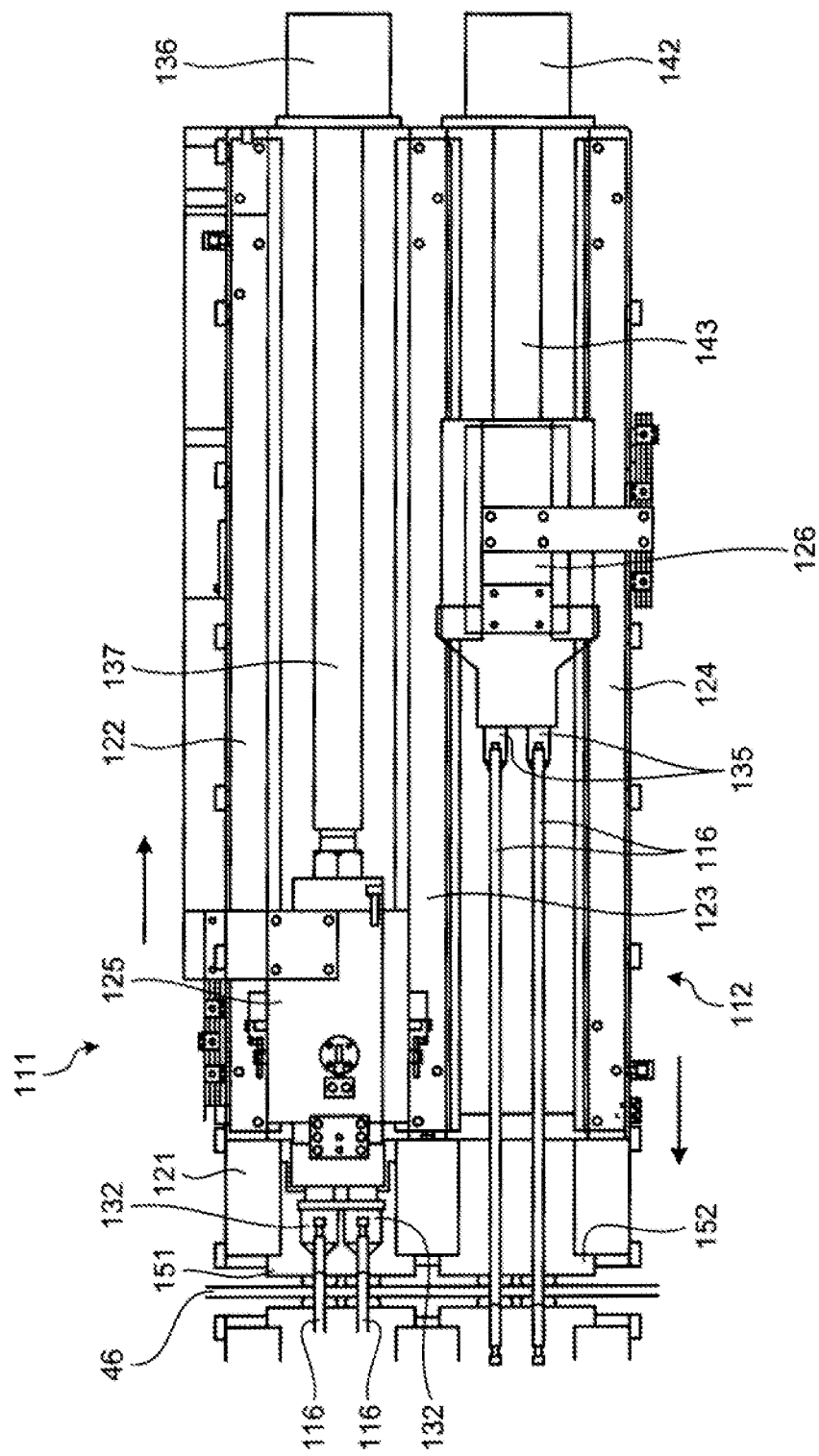
FIG. 4 is a plan view illustrating one side of a broaching machine of the present embodiment.
Figure 5:
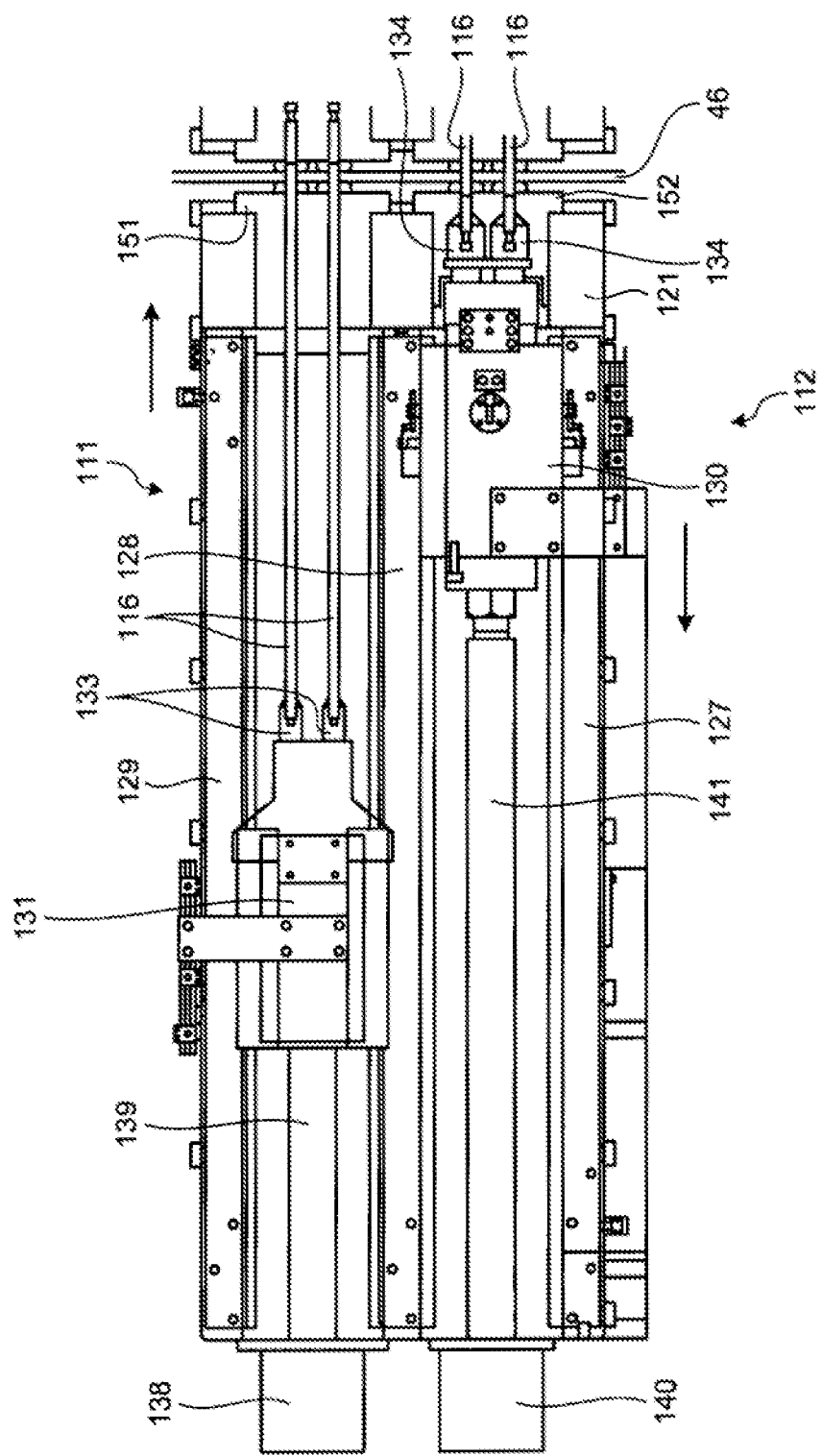
FIG. 5 is a plan view illustrating the other side of the broaching machine of the present embodiment.
Figure 6:
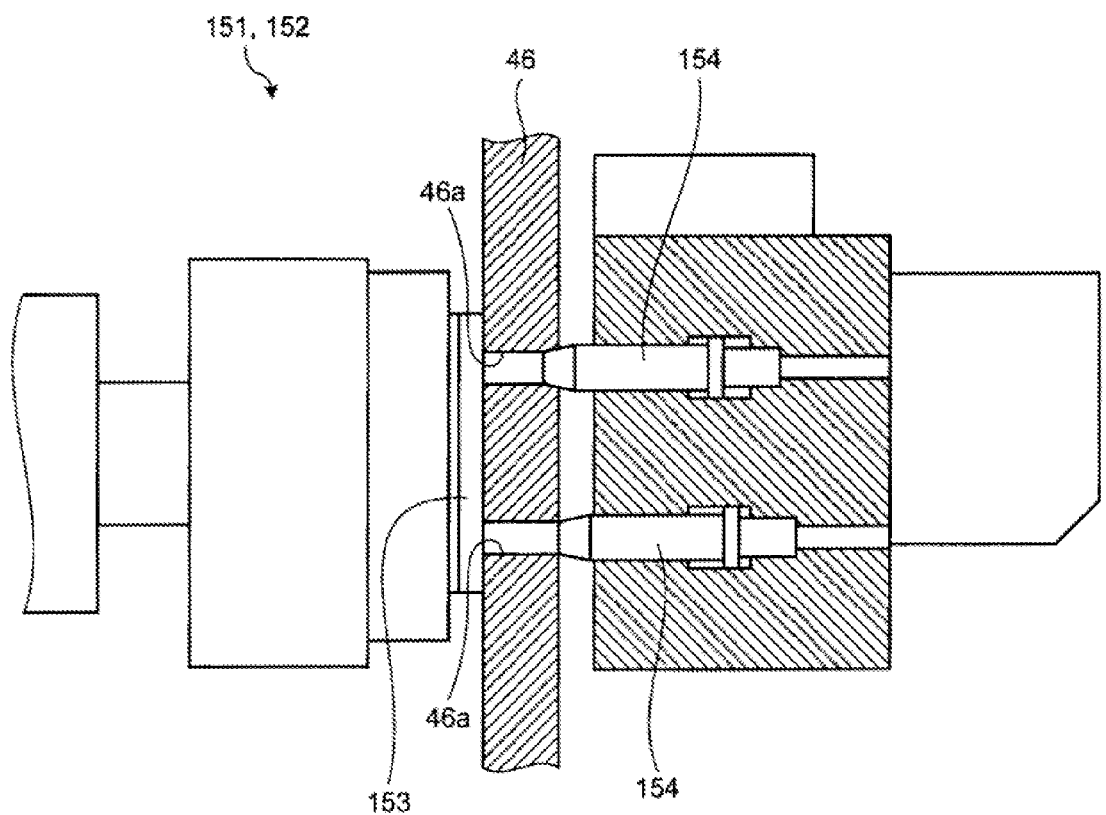
FIG. 6 is a schematic diagram illustrating a clamp mechanism in the broaching machine of the present embodiment.
Figure 7:
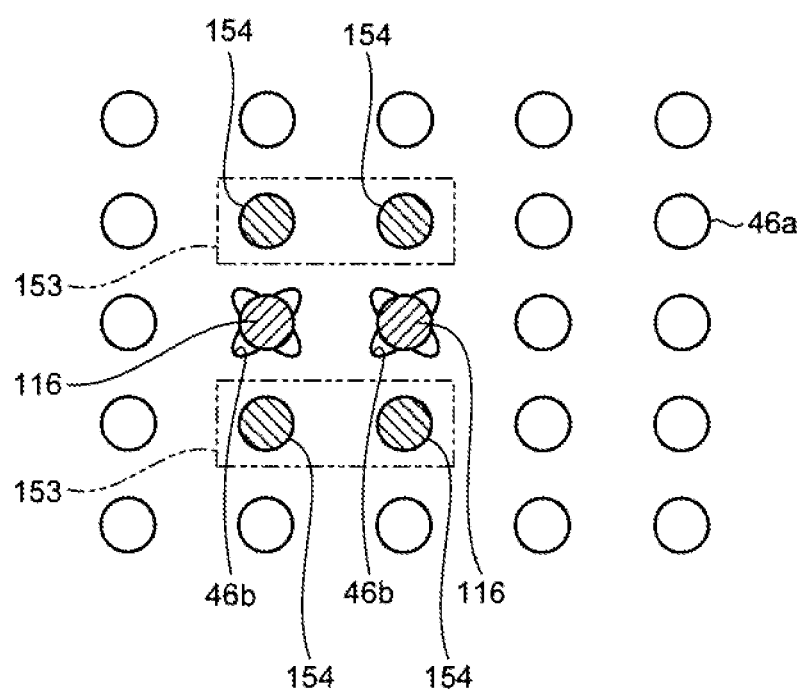
FIG. 7 is an explanatory diagram illustrating a support position of a broach and a clamp pin in the broaching machine of the present embodiment.
Figure 8:
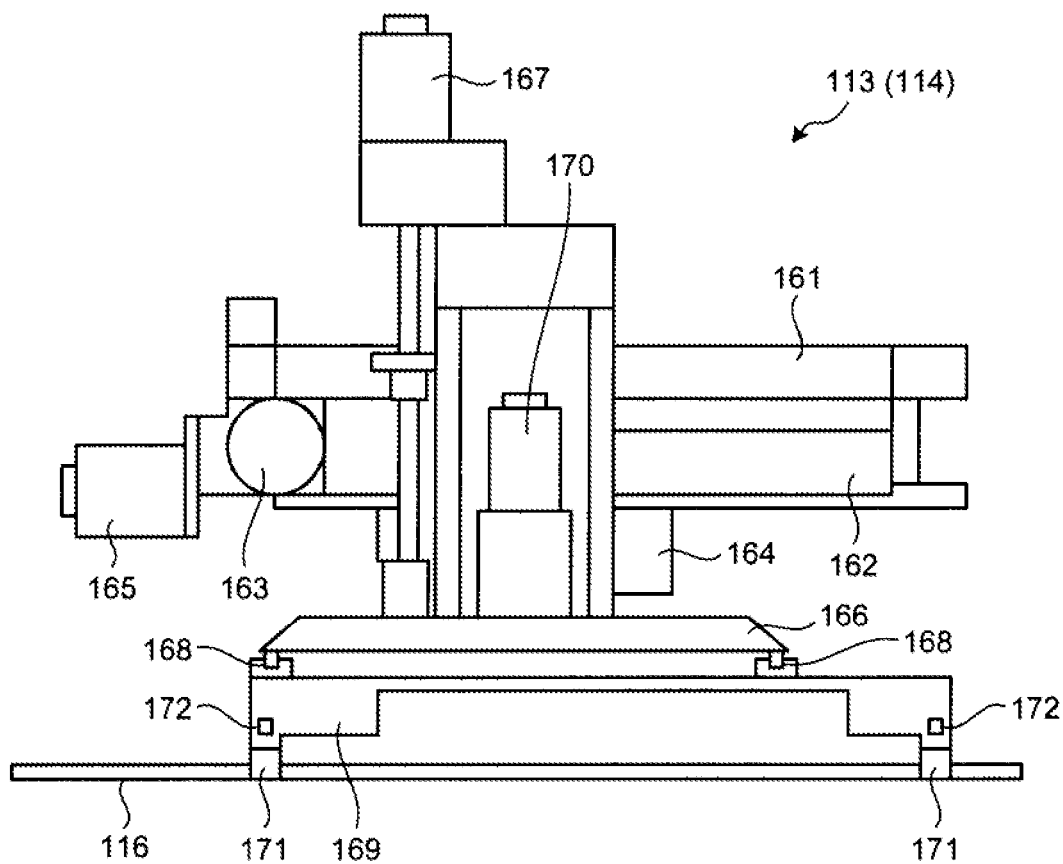
FIG. 8 is a front view illustrating a manipulator of the present embodiment.
Figure 9:
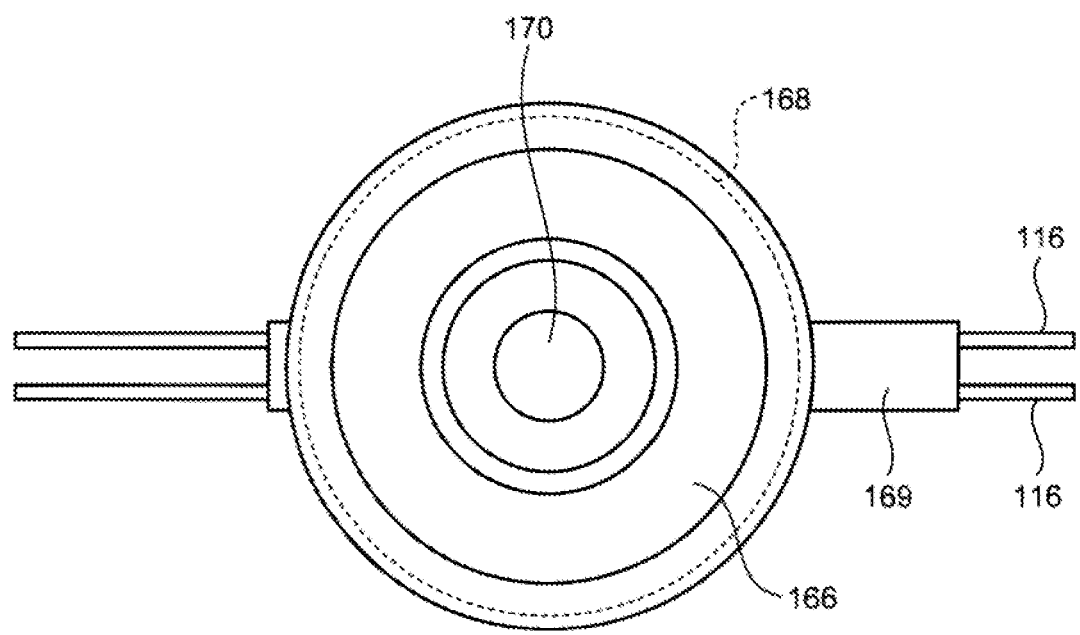
FIG. 9 is a plan view illustrating the manipulator of the present embodiment.
Figure 10:
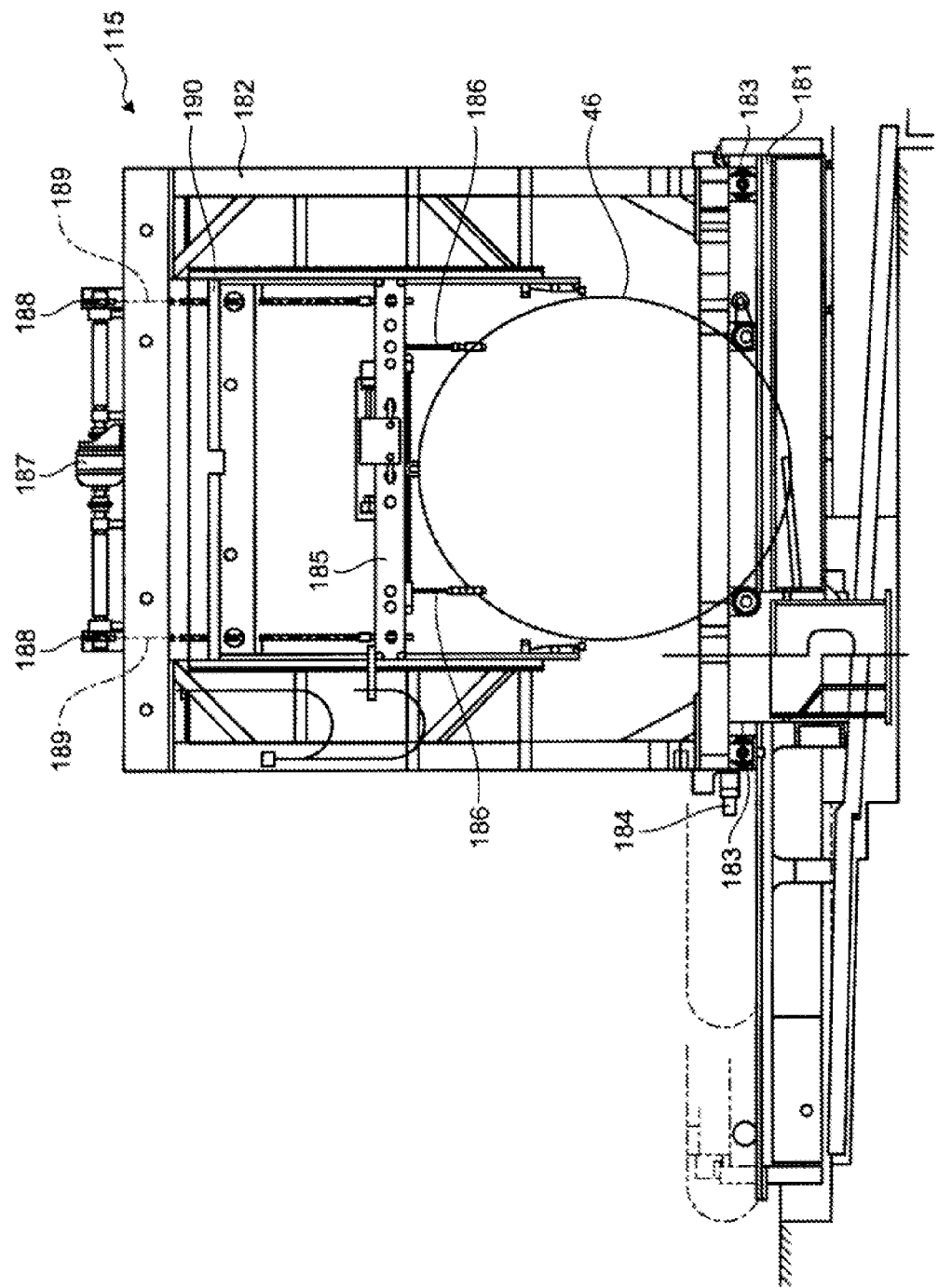
FIG. 10 is a front view illustrating a gantry of the present embodiment.
Figure 13:
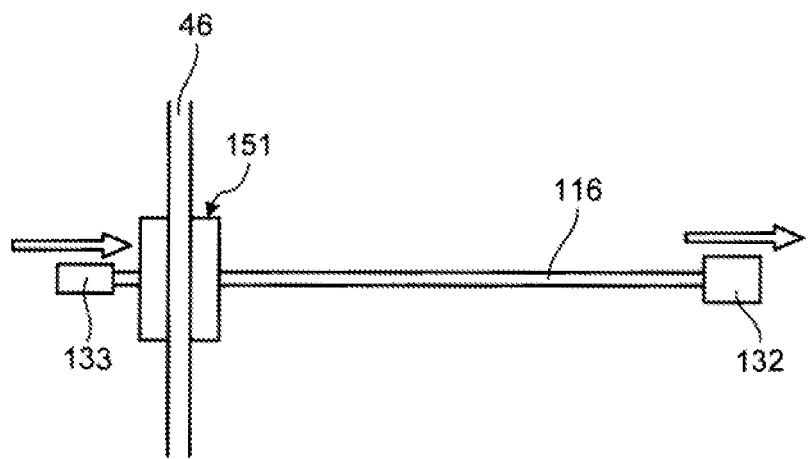
FIG. 13 is a schematic diagram illustrating a machining method by the broaching device.
Figure 14:
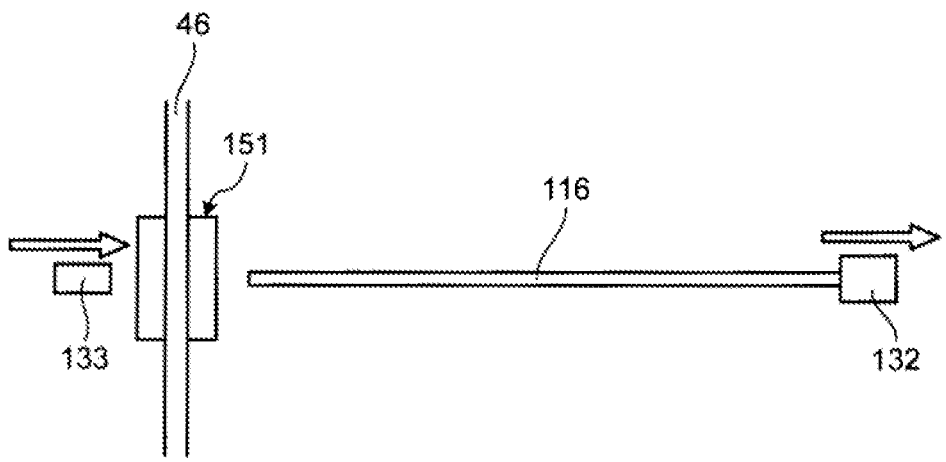
FIG. 14 is a schematic diagram illustrating a machining method by the broaching device.
Figure 15:
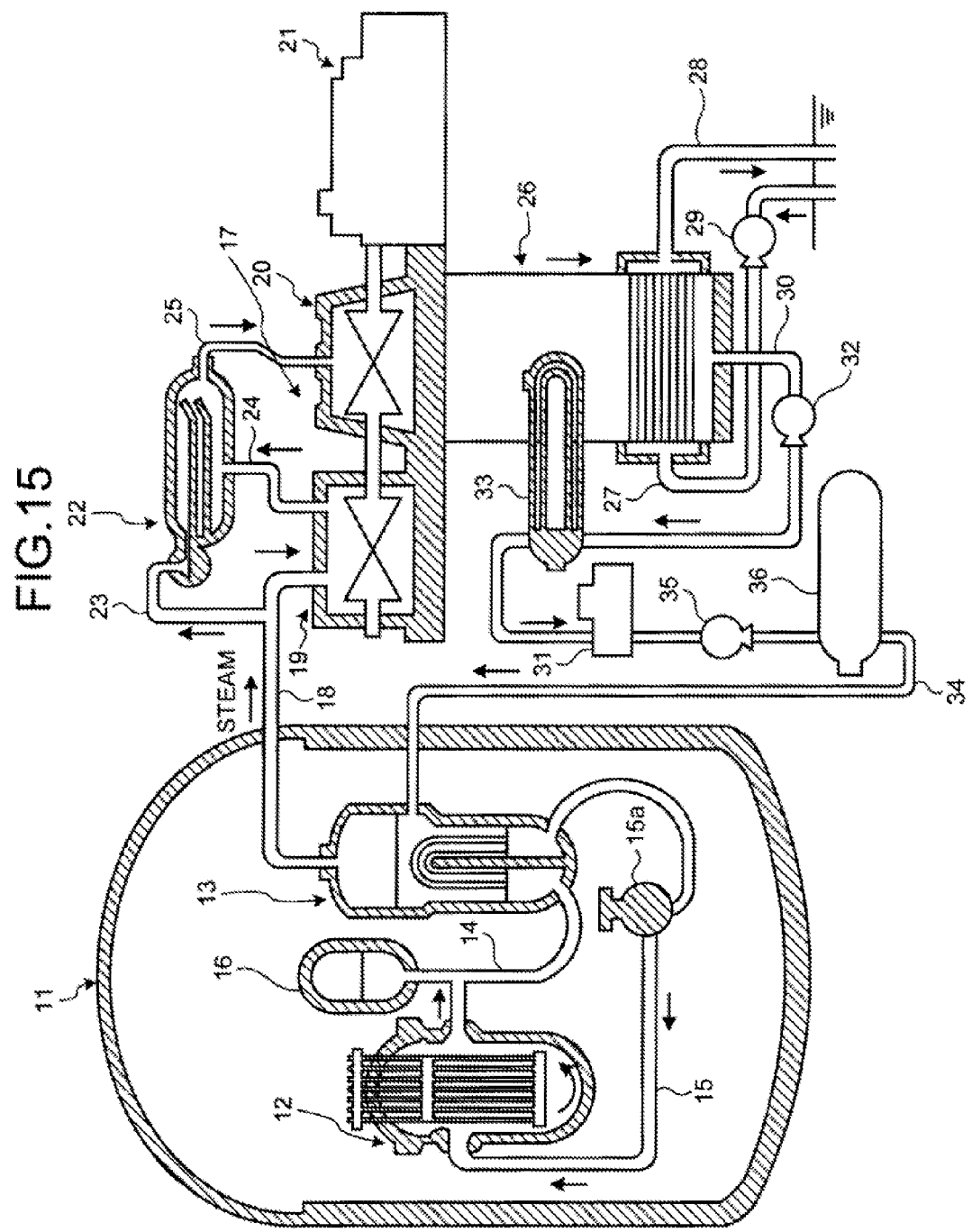
FIG. 15 is a schematic construction diagram of a nuclear power plant to which a steam generator of the present embodiment is applied.
Figure 16:
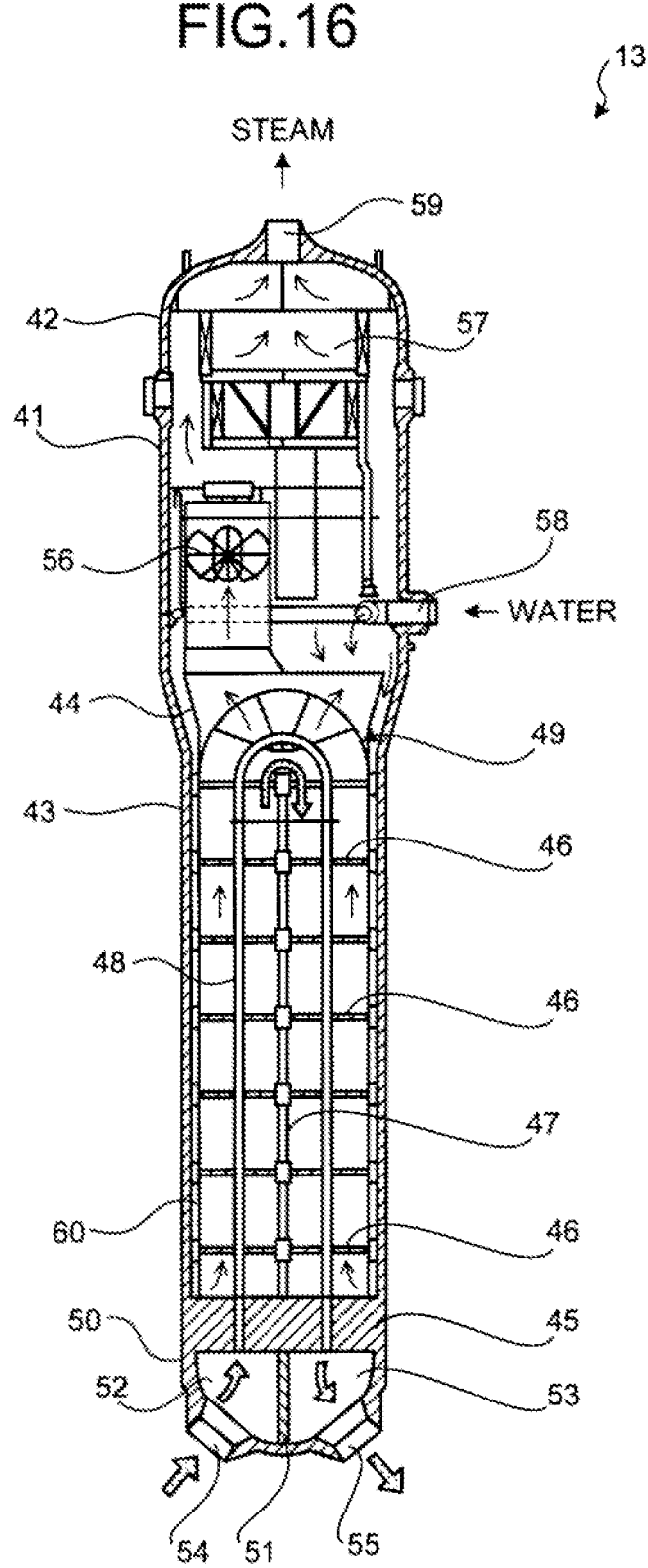
FIG. 16 is a schematic construction diagram illustrating the steam generator of the present embodiment.

FIG. 1 is a control block diagram of a broaching device, according to an embodiment of the present invention, FIG. 2 is a front view of the broaching device of the present embodiment, FIG. 3 is a plan view of the broaching device of the present embodiment, FIG. 4 is a plan view illustrating one side of a broaching machine of the present embodiment, FIG. 5 is a plan view illustrating the other side of the broaching machine of the present embodiment, FIG. 6 is a schematic diagram illustrating a clamp mechanism in the broaching machine of the present embodiment, FIG. 7 is an explanatory diagram illustrating a support position of a broach and a clamp pin in a broaching machine of the present embodiment, FIG. 8 is a front view illustrating a manipulator of the present embodiment, FIG. 9 is a plan view illustrating the manipulator of the present embodiment, FIG. 10 is a front view illustrating a gantry of the present embodiment, FIGS. 11 through 14 are schematic diagrams illustrating machining methods by the broaching device, FIG. 15 is a schematic construction diagram of a nuclear power plant to which a steam generator of the present embodiment is applied, and FIG. 16 is a schematic construction diagram illustrating the steam generator of the present embodiment.

A reactor of the present embodiment is a pressurized water reactor (PWR) that uses light water as a reactor coolant and a neutron moderator, fills the entire reactor core with not-boiled, high-temperature and high-pressure water, transfers the high-temperature and high-pressure water to a steam generator to generate steam by heat exchange, and transfers the steam to a turbine generator to generate power.

In a nuclear power plant that has the pressurized water reactor of the present embodiment, as illustrated in FIG. 15, a pressurized water reactor 12 and a steam generator 13 are housed in a containment 11, the pressurized water reactor 12 and the steam generator 13 are coupled with each other via cooling water pipes 14 and 15, the cooling water pipe 14 is provided with a pressurizer 16, and the cooling water pipe 15 is provided with a cooling water pump 15a. In this case, light water is used as a moderator and primary cooling water (a coolant), and a primary cooling system maintains a high-pressure condition of about 150 to 160 atmospheres with the pressurizer 16 in order to suppress boiling of the primary cooling water in a reactor core part. Therefore, the light water as the primary cooling water is heated by low-enriched uranium or MOX as fuel (nuclear fuel) in the pressurized water reactor 12, and the high-temperature primary cooling water is transferred to the steam generator 13 through the cooling water pipe 14 with predetermined high pressure maintained by the pressurizer 16. In this steam generator 13, heat exchange is performed between the high-pressure and high-temperature primary cooling water and secondary cooling water, and cooled primary cooling water is returned to the pressurized water reactor 12 through the cooling water pipe 15.

The steam generator 13 is coupled with a steam turbine 17 via a cooling water pipe 18. The steam turbine 17 has a high-pressure turbine 19 and a low-pressure turbine 20, and is connected with a generator 21. Further, a moisture separator/heater 22 is provided between the high-pressure turbine 19 and the low-pressure turbine 20, and is coupled with a cooling water branch pipe 23 branched from the cooling water pipe 18, while the high-pressure turbine 19 and the moisture separator/heater 22 are coupled with each other by a low-temperature reheat pipe 24, and the moisture separator/heater 22 and the low-pressure turbine 20 are coupled with each other by a high-temperature reheat pipe 25.

Further, the low-pressure turbine 20 of the steam turbine 17 has a condenser 26, and a water intake pipe 27 and a drain pipe 28 that supplies/discharges cooling water (for example, seawater) are coupled with the condenser 26. The water intake pipe 27 has a circulating water pump 29, and the other ends of the circulating water pump 29 and the drain pipe 28 are arranged in the sea. Further, the condenser 26 is coupled with a deaerator 31 via a cooling water pipe 30, and the cooling water pipe 30 is provided with a condenser pump 32 and a low-pressure feedwater heater 33. The deaerator 31 is coupled with the steam generator 13 via a cooling water pipe 34, and the cooling water pipe 34 is provided with a feed pump 35 and a high-pressure feedwater heater 36.

Therefore, steam generated by heat exchange with the high-pressure and high-temperature primary cooling water in the steam generator 13 is transferred to the steam turbine 17 through the cooling water pipe 18 (from the high-pressure turbine 19 to the low-pressure turbine 20), and the steam turbine 17 is driven by this steam and power is generated by the generator 21. At this time, after the steam from the steam generator 13 has driven the high-pressure turbine 19, moisture included in the steam is removed in the moisture separator/heater 22 and the steam drives the low-pressure turbine 20 after heated. The steam that has driven the steam turbine 17 is then cooled in the condenser 26 using seawater and becomes condensed water, and is heated in the low-pressure feedwater heater 33 by low-pressure steam extracted from the low-pressure turbine 20, for example. Then, after impurities such as dissolved oxygen and non-condensable gas (ammonia gas) are removed in the deaerator 31, the steam is heated in the high-pressure feedwater heater 36 by high-pressure steam extracted from the high-pressure turbine 19, for example, and is then returned to the steam generator 13.

The steam generator 13 applied to the nuclear power plant constructed in this way, as illustrated in FIG. 16, a trunk body 41 has a sealed hollow cylindrical shape and has a lower portion with a slightly smaller diameter than an upper portion. The trunk body 41 is constructed such that an upper trunk 42 and a lower trunk 43 are connected by means of welding. A tube bundle shroud 44 having a cylindrical shape is disposed in the lower trunk 43 in the trunk body 41 with a predetermined gap with an inner wall surface of the lower trunk 43, and a lower end portion of the tube bundle shroud 44 is extended in the vicinity of a tube plate 45.

A plurality of tube support plates 46 is disposed in the tube bundle shroud 44, each of which corresponds to a predetermined height position, and is supported by a plurality of stay rods 47 extended upward from the tube plate 45. Further, a heat transfer tube bundle 49 made of a plurality of inversely U-shaped heat transfer tubes 48 is disposed inside the tube bundle shroud 44. An end portion of each of the heat transfer tubes 48 is expanded and supported by the tube plate 45, and an intermediate portion of each of the heat transfer tubes 48 is supported by the plurality of tube support plates 46. In this case, a plurality of through holes (not shown) is formed in the tube support plates 46, and each of the heat transfer tubes 48 is inserted into the through holes and is supported.

A channel head 50 is fixed to a lower end portion of the lower trunk 43, and an inside of the channel head 50 is partitioned by a partition wall 51 into an inlet chamber 52 and an outlet chamber 53, and an inlet nozzle 54 and an outlet nozzle 55 are formed thereto. One end portion of each of the heat transfer tubes 48 communicates into the inlet chamber 52, and the other end portion communicates into the outlet chamber 53. Note that the inlet nozzle 54 is coupled with the above-described cooling water pipe 14 while the outlet nozzle 55 is coupled with the cooling water pipe 15.

The upper trunk 42 is provided with a steam-water separator 56 that separates feedwater into steam and hot water, and a moisture separator 57 that removes moisture of the separated steam and causes the steam to be into a near drysteam condition. Further, the upper trunk 42 has a water tube 58 inserted between the heat transfer tube bundle 49 and the steam-water separator 56, the water tube 58 feeding the secondary cooling water into the trunk body 41, and has a steam outlet 59 formed in a ceiling portion. Further, the trunk body 41 is provided with a feedwater path 60 that causes the secondary cooling water supplied from the water tube 58 to the trunk body 41 to flow downward between the trunk body 41 and the tube bundle shroud 44 and to circulate upward at the tube plate 45, and causes the secondary cooling water to be subjected to heat exchange with hot water (primary cooling water) that flows in each of the heat transfer tubes 48 when the secondary cooling water goes up in the heat transfer tube bundle 49. Note that the water tube 58 is coupled with the above-described cooling water pipe 34, and the steam outlet 59 is coupled with the cooling water pipe 18.

Therefore, the primary cooling water heated in the pressurized water reactor 12 is transferred to the inlet chamber 52 of the steam generator 13 through the cooling water pipe 14, is circulated through the plurality of heat transfer tubes 48, and reaches the outlet chamber 53. Meanwhile, the secondary cooling water cooled in the condenser 26 is transferred to the water tube 58 of the steam generator 13 through the cooling water pipe 34, and is subjected to heat exchange with the hot water (primary cooling water) flowing in the heat transfer tubes 48 through the feedwater path 60 in the trunk body 41. That is, the heat exchange is performed between the high-pressure and high-temperature primary cooling water and the secondary cooling water in the trunk body 41, and the cooled primary cooling water is returned from the outlet chamber 53 to the pressurized water reactor 12 through the cooling water pipe 15. Meanwhile, the secondary cooling water subjected to the heat exchange with the high-pressure and high-temperature primary cooling water goes up in the trunk body 41, is separated into steam and hot water in the steam-water separator 56, and is transferred to the steam turbine 17 through the cooling water pipe 18 after moisture is removed in the moisture separator 57.

In the steam generator 13 constructed in this way, the trunk body 41 has the plurality of tube support plates 46 provided in a lower portion at predetermined intervals, and has the tube plate 45 provided in a lower end portion. Further, the plurality of heat transfer tubes 48 that constitutes the heat transfer tube bundle 49 has end portions fixed to a plurality of mounting holes formed in the tube plate 45, and intermediate portions supported by a plurality of through holes formed in each of the tube support plates 46. Since each of the mounting holes in the tube support plates 46 is required to upwardly transfer the secondary cooling water (steam) heated by the primary cooling water, the mounting hole has a variant form with a plurality of notched portions formed in a circular outer periphery that serves as a cross section of the heat transfer tubes 48. In this case, the plurality of mounting holes having the variant form and formed in the tube support plates 46 is machined and formed by a broaching device.

In the present embodiment, as illustrated in FIGS. 2 and 3, a broaching device 100 includes two broaching machines 111 and 112, two manipulators 113 and 114, and a gantry (broach moving device) 115.

The two broaching machines 111 and 112, with holding breaches 116, form mounting holes 46b having a variant form by causing the broaches 116 to penetrate prepared holes 46a in the tube support plate 46 as a member to be machined. The broaching machines 111 and 112 have an almost equal construction, are arranged parallel to an upper portion of a frame 121, and are positioned so as to horizontally face in 180-degree opposite directions. The manipulators 113 and 114 turn the broach 115 by 180 degrees, and deliver the broach 116 between the broaching machines 111 and 112. Both the manipulators 113 and 114 have an almost equal construction, and are provided corresponding to the broaching machines 111 and 112. The gantry 115 has an arch-like shape to cross the frame 121, and is capable of hanging and supporting the tube support plates 46.

In the broaching machines 111 and 112, as illustrated in FIGS. 4 and 5, three guide rails 122, 123, and 124 are fixed to one side (right side in FIG. 4) of the frame 121 in the longitudinal direction, a ram slide 125 is supported between the guide rails 122 and 123 in a freely movable manner, and a retriever slide 126 is supported between the guide rails 123 and 124 in a freely movable manner. Further, three guide rails 127, 128, and 129 are fixed to the other side (left side in FIG. 5) of the frame 121 in the longitudinal direction, a ram slide 130 is supported between the guide rails 127 and 128 in a freely movable manner, and a retriever slide 131 is supported between the guide rails 123 and 129 in a freely movable manner.

Further, two first puller heads 132 are mounted to the ram slide 125, and two first retriever heads 133 are mounted to the retriever slide 131, so that a first broaching machine 111 is constructed. Further, two second puller heads 134 are mounted to the ram slide 130, and two second retriever heads 135 are mounted to the retriever slide 126, so that a second broaching machine 112 is constructed. In this case, the first puller heads 132 and the first retriever heads 133 are arranged on a straight line, and the second puller heads 134 and the second retriever heads 135 are arranged on a straight line. Further, the second retriever heads 135 are positioned adjacent to the first puller heads 132, and the first retriever heads 133 are positioned adjacent to the second puller heads 134. Note that the numbers of the puller heads 132 and 134 and the retriever heads 133 and 135 are not limited to two, and may be one, or three or more.

Note that, although not illustrated, each of the puller heads 132 and 134 has a holding claw capable of holding a tip portion of the holding broach 116, and openable/closable by a drive unit. Further, each of the retriever heads 133 and 135 has a hole for holding a base end portion of the broach 116.

In the first broaching machine 111, a first main motor (first electric motor) 136 is mounted to one end portion of the frame 121, and a driving shaft is coupled with the ram slide 125 via a ball screw shaft 137. Further, a first sub motor (second electric motor) 138 is mounted to the other end portion of the frame 121, and a driving shaft is coupled with the retriever slide 131 via a ball screw shaft 139. Therefore, the ram slide 125 is moved by the first main motor 136 via the ball screw shaft 137, so that the first puller heads 132 can be moved. Further, the retriever slide 131 is moved by the first sub motor 138 via the ball screw shaft 139, so that the first retriever heads 133 can be moved.

A second main motor (first electric motor) 140 is mounted to the other end portion of the frame 121, and a driving shaft is coupled with the ram slide 130 via a boll screw shaft 141 in the second broaching machine 112. Further, a second sub motor (second electric motor) 142 is mounted to one end portion of the frame 121, and a driving shaft is coupled with the retriever slide 126 is a ball screw shaft 143. Therefore, the ram slide 130 is moved by the second main motor 140 via the boll screw shaft 141, so that the second puller heads 134 can be moved. Further, the retriever slide 126 is moved by the second sub motor 142 via the ball screw shaft 143, so that the second retriever heads 135 can be moved.

As illustrated in FIG. 1, a control device 117 is capable of driving and controlling the first main motor 136, the first sub motor 138, the second main motor 140, and the second sub motor 142. Further, during operation of the broaching machines 111 and 112, the control device 117 enables the puller heads 132 and 134 and the retriever heads 133 and 135 to be synchronized with each other and to move at a fixed speed by controlling the motors 136, 138, 140, and 142.

In this case, rotation speed sensors 144, 145, 146, and 147 that detect a rotation speed are respectively mounted on the motors 136, 138, 140, and 142, and the control device 117 controls the rotation speeds of the motors 136, 138, 140, and 142 to be a fixed rotation speed based on detection results of the rotation speed sensors 144, 145, 146, and 147.

That is, the first puller heads 132 and the first retriever heads 133 are moved into one direction by the motors 136 and 138, respectively, and the second puller heads 134 and the second retriever heads 135 are moved into the other direction by the motors 140 and 142, respectively, with each of the puller heads 132 and 134 holding a tip portion of the broach 116 and each of the retriever heads 133 and 135 holding a base end portion of the broach 116, so that broaching can be performed by four broaches 116.

At this time, the holding of the broaches 116 by the retriever heads 133 and 135 are released at a predetermined machining stage by the broaches 116 associated with the movement of the puller heads 132 and 134 and the retriever heads 133 and 135. At this time, the control device 117 stops the movement of the retriever heads 133 and 135 by controlling the sub motors 138 and 142, and performs machining by the broaches 116 only by the movement of the puller heads 132 and 134.

Further, as illustrated in FIGS. 4 and 5, clamp devices 151 and 152, which support and position the tube support plates 46 supported by the gantry 115, are provided between the puller heads 132 and 134 and the retriever heads 133 and 135. The clamp devices 151 and 152 have a similar construction, and, as illustrated in FIGS. 6 and 7, has a pair of upper and lower supporting members 153 that support an upper portion and a lower portion of prepared holes 46a machined by she broach 116 from one side of the tube support plate 46, and a pair of upper and lower supporting pins 154 that is inserted into and support prepared holes 46a at the upper portion and the lower portion of the prepared holes 46a machined by the broach 116 from the other side of the tube support plate 46.

In this case, the upper and lower supporting pins 154 are advanced by a drive unit (hydraulic cylinder) (not illustrated) with respect to the upper and lower supporting members 153 arranged at predetermined positions, and tapered tip portions are engaged with the prepared holes 46a, so that the tube support plate 46 can be positioned to a predetermined position. In this case, the supporting members 153 support the tube support plate 46 from a side of the puller heads 132 and 134, and the supporting pins 154 support the tube support plate 46 from a side of the retriever heads 133 and 135.

Since the first and second manipulators 113 and 114 have a similar construction, only the first manipulator 113 will be described. In the first manipulator 113, as illustrated in FIGS. 8 and 9, a first moving frame 162 is supported by a support beam 161 along the horizontal direction in a freely movable manner, and is movable by a servo motor 163. A second moving frame 164 is supported by the first moving frame 162 in a freely movable manner in the horizontal direction perpendicular to the first moving frame 162, and is movable by a servo motor 165. A disk-shaped third moving frame 166 is supported by the second moving frame 164 in a freely movable manner in the vertical direction, and is movable by a servo motor 167.

A ring-shaped guide rail 168 is fixed to the third moving frame 166, and a turn table 169 is supported by the guide rail 168 in a freely turning manner along the horizontal direction and can be turned by a servo motor 170. The turn table 169 is extended in a radial direction through a center position of the third moving frame 166, and two holding claws 171 are mounted to each of lower portions of end portions of the turn table 169 in the longitudinal direction. The holding claws 171 are capable of holding the broaches 116 by being opened/closed by a drive unit (not illustrated).

Therefore, the holding claws 171 can hold the broaches 116 held by the puller heads 132 and 134. The broaches 116 can be turned by turning the turn table 169 by driving the servo motor 167 with the holding claws 171 holding the broaches 116. Further, the turn table 169 is moved by driving the servo motor 165, and the held broaches 116 can be moved as it is in the longitudinal direction.

Further, each of the manipulators 113 and 114 is provided with a broach detection sensor 172 that detects the holding of the broach 116 by each of the holding claws 171. The control device 117 controls an actuation of each of the manipulators 113 and 114 based on a detection result of the broach detection sensor 172.

As illustrated in FIG. 10, in the gantry 115, a guide rail 181 is laid along the horizontal direction perpendicular to the longitudinal direction of the broaching machines 111 and 112, and an arch-shaped gantry main body 182 is supported by a plurality of wheels 183 in a freely movable manner, and is movable by a drive motor 184.

An ascent/descent frame 185 is supported by the gantry main body 182 in a freely movable manner along an up-and-down direction, and is capable of hanging and supporting the tube support plate 46 via a pair of hanging chains 186. The gantry main body 182 has an ascent/descent motor 187 disposed at an upper portion, and is provided with a pair of sprockets 188 driven by the ascent/descent motor 187. A pair of ascent/descent chains 189 is hooked to intersect at an upper part of an upper portion of the gantry main body 182, and is engaged with the sprockets 183, and one end portion is coupled with the ascent/descent frame 185 and the other end portion is coupled with a balance weight 190.

Therefore, the tube support plate 46 can be moved in the horizontal direction by the drive motor 184 via the gantry main body 182, and the tube support plate 46 can be ascended/descended by the ascent/descent motor 187 via the ascent/descent frame 185, so that the position of the tube support plate 46 with respect to the broaching machines 111 and 112 can be adjusted.

Here, broaching with respect to the prepared hole 46a in the tube support plate 46 by the broaching device 100 according to the present embodiment will be described.

First, as illustrated in FIG. 10, the tube support plate 46 is hung from and supported by the ascent/descent frame 185 via the hanging chains 186, and under this condition, the gantry main body 182 is moved by the drive motor 184, and the ascent/descent frame 185 is ascended/descended by the ascent/descent motor 187, so that positioning of the tube support plate 46 with respect to the broaching machines 111 and 112 is adjusted. Further, as illustrated in FIG. 6, the upper and lower supporting pins 154 are advanced with respect to the upper and lower supporting members 153, and the tapered tip portions are engaged with the prepared holes 46a, respectively, so that the tube support plate 46 are positioned to predetermined positions.

Next, as illustrated in FIGS. 8 and 9, the manipulators 113 and 114 hold the broaches 116, and, as illustrated in FIGS. 4 and 5, move the held broaches 116 to positions between the first puller heads 132 and the first retriever heads 133 at stand-by positions, that is, between the second puller heads 134 and the second retriever heads 135, and from there, move the broaches 116 in the longitudinal direction. Then, tip portions of the broaches 116 are inserted into the prepared holes 46a in the tube support plate 46 from a side of the retriever heads 133 and 135, and are inserted into and held by the puller heads 132 and 134. Following that, the retriever heads 133 and 135 are advanced to hold base end portions of the broaches 116. Then, the manipulators 113 and 114 release the holding of the broaches 116 and retreat upward.

The ram slides 125 and 130 and the retriever slides 131 and 126 are moved at a fixed speed by synchronizing and driving the motors 136, 138, 140, and 142 with the puller heads 132 and 134 holding the tip portions of the broaches 116 and the retriever heads 133 and 135 holding the base end portions of the broaches 116. Then, each of the broaches 116 is moved in each of the prepared holes 46a in the tube support plate 46, so that each of the prepared holes 46a is subjected to the broaching, and the mounting holes 46*b* having a predetermined shape can be formed.

Figure 11:
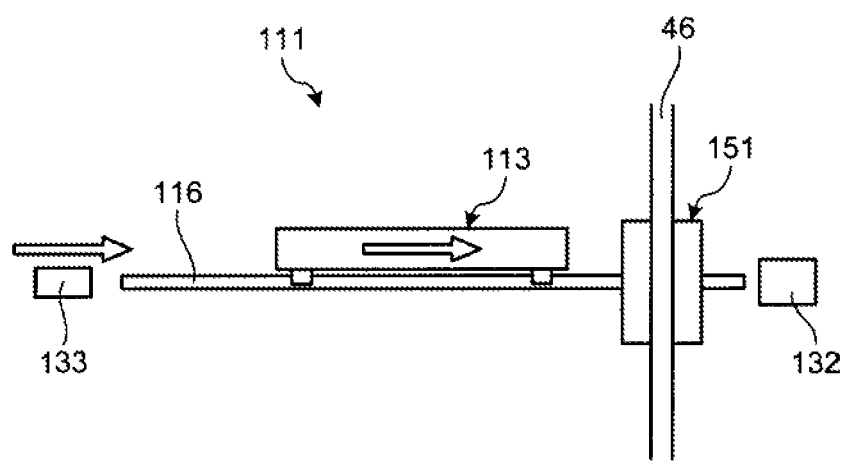
FIG. 11 is a schematic diagram illustrating a machining method by the broaching device.
Figure 12:
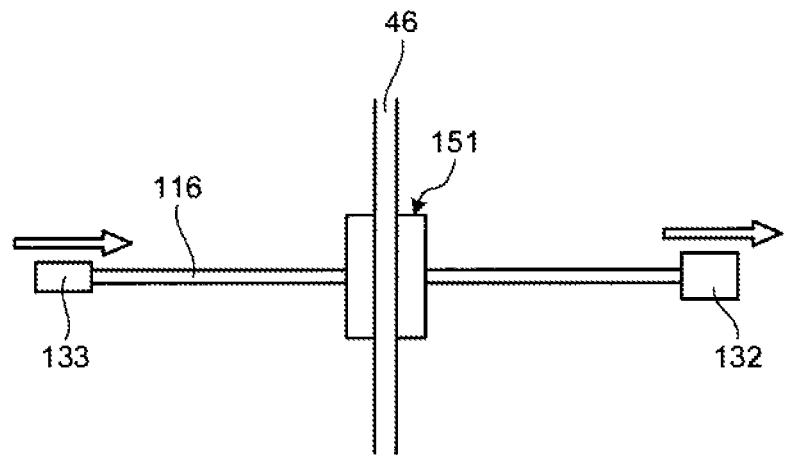
FIG. 12 is a schematic diagram illustrating a machining method by the broaching device.

That is, for example, in the first broaching machine 111, as illustrated in FIG. 11, the first manipulator 113 holds the broach 116 and inserts the broach 116 into the prepared hole 46*a* in the tube support plate 46. As illustrated in FIG. 12, the tip portion is inserted into the first puller head 132 and is held, and the first retriever head 133 is advanced to hold the base end portion. Under this condition, as illustrated in FIG. 13, when the first puller head 132 and the first retriever head 133 are moved at a fixed speed, the prepared hole 46*a* in the tube support plate 46 is subjected to the broaching by the broach 116, so that the mounting hole 46*b* is formed. Then, as illustrated in FIG. 14, when a cutting edge portion of the broach 116 passes through the prepared hole 46*a*, the holding of the broach 116 by the first retriever heads 133 is released and the movement is stopped. Meanwhile, when the first puller head 132 keeps moving, the broach 116 is taken out from the tube support plate 46.

At this time, the rotation speed sensors 144, 145, 146, and 147 detect rotation speeds of the motors 136, 138, 140, and 142, and output the rotation speeds to the control device 117. Therefore, the control device 117 feedback controls the motors 136, 138, 140, and 142 such that the rotation speeds can be a fixed rotation speed based on the detection results of the rotation speed sensors 144, 145, 146, and 147.

When the first broaching is completed, the positioning of the tube support plates 46 by the clamp mechanisms 151 and 152 is released, the gantry main body 182 is moved by the drive motor 184, and the ascent/descent frame 185 is ascended/descended by the ascent/descent motor 187 as illustrated in FIG. 10, so that the positions of the tube support plates 46 with respect to the broaching machines 111 and 112 are adjusted. Meanwhile, as illustrated in FIGS. 8 and 9, the manipulators 113 and 114 are descended, and the holding claws 171 hold the broaches 116 held by the puller heads 132 and 134. At this time, each of the broach detection sensors 172 detects the holding of the broaches 116 by the holding claws 171, and dropping of the broaches 116 can be detected here. Then, the puller heads 132 and 134 are taken out from the broaches 116 by moving the turn table 169 by the servo motor 165, and after ascended, the broaches 116 are moved to stand-by positions at a side of the retriever heads 133 and 135 by turning the turn table 169 by 180 degrees by the servo motor 170. Hereinafter, a similar actuation to the above is performed.

In this way, the broaching device according to the present embodiment is provided with the puller heads 132 and 134 that hold the tip portions of the broaches 116 and are supported in a horizontally freely movable manner, the main motors 136 and 140 capable of moving the puller heads 132 and 134, the retriever heads 133 and 135 that hold the base end portions of the broaches 116 and are supported in a horizontally freely movable manner, the sub motors 136 an 142 capable of moving the retriever heads 133 and 135, and the control device 117 that enables the puller heads 132 and 134 and the retriever heads 133 and 135 to be synchronized with each other and to move at a fixed speed by controlling the motors 136, 138, 140, and 142.

Therefore, the control device 117 controls the motors 136, 138, 140, and 142 to synchronize and move the puller heads 132 and 134 and the retriever heads 133 and 135 at a fixed speed, so that the puller heads 132 and 134 and the retriever heads 133 and 135 can move the held broaches 116 at a fixed speed and perform broaching with respect to the tube support plates 46, and the machining accuracy can be improved.

Further, the broaching device of the present embodiment is provided with the rotation speed sensors 144, 145, 146, and 147 that detect the rotation speeds of the motors 136, 138, 140, and 142, and the control device 117 controls the motors 136, 138, 140, and 142 such that the rotation speeds can be a fixed rotation speed based on the detection results of the rotation speed sensors 144, 145, 146, and 147. Therefore, the control device 117 can synchronize and move the puller heads 132 and 134 and the retriever heads 133 and 135 at a fixed speed with a simple construction by controlling the motors 135, 138, 140, and 142 based on the detection results of the rotation speed sensors 144, 145, 146, and 147.

Further, in the broaching device of the present embodiment, when the holding of the broaches 116 by the retriever heads 133 and 135 is released at a predetermined machining stage by the broaches 116 associated with the movement of the puller heads 132 and 134 and the retriever heads 133 and 135, the control device 117 stops the movement of the retriever heads 133 and 135 by controlling the sub motors 132 and 142. Therefore, when the broaching proceeds to a predetermined machining stage by the movement of the broaches 116, the holding of the broaches 116 by the retriever heads 133 and 135 is released and the movement is stopped, so that only the puller heads 132 and 134 move and machine the broaches 116, and proper broaching with respect to the prepared holes 46*a* can be performed.

Further, the broaching device of the present embodiment is provided with the clamp devices 151 and 152 that support the tube support plates 46 between the puller heads 132 and 134 and the retriever heads 133 and 135, and the clamp devices 151 and 152 have the pair of upper and lower supporting members 153 that support the upper portion and the lower portion of the prepared holes 46*a* machined by the broaches 116 from one side of the tube support plate 46, and the pair of upper and lower supporting pins 154 that are inserted into and supports prepared holes 46*a* at the upper and lower portions of the prepared holes 46*a* machined by the broaches 116 from the other side of the tube support plate 46. Therefore, the tube support plate 46 has the upper portion and the lower portion of the prepared holes 46*a*, which are machined by the broaches 116, are supported by the supporting members 153 and the supporting pins 154, whereby broaching becomes possible, and the machining accuracy can be improved.

Further, in the broaching device of the present embodiment, the first puller heads 132 and the first retriever heads 133 are arranged on a straight line, the second puller heads 134 and the second retriever heads 135 are arranged on a straight line, the second retriever heads 135 are positioned adjacent to the first puller heads 132, the manipulators 113 and 114 capable of turning the broaches 115 by 180 degrees in the horizontal direction and delivering the broaches 116 between the first puller heads 132 and the second puller heads 134, and the manipulators 113 and 114 have the holding claws 171 capable of holding the broaches 116, and the broach detection sensors 172 that detect the holding of the broaches 116 by the holding claws 171. Therefore, when the manipulators 113 and 114 deliver the broaches 116 between the first puller heads 132 and the second puller heads 134, the broach detection sensors 172 detect the holding of the broaches 116 by the holding claws 171, and therefore, proper delivery of the broaches 116 by the manipulators 113 and 114 can be grasped on a steady basis.

Note that, although, in the above-described embodiment, the broaching device 100 has the puller heads 132 and 134 and the retriever heads 133 and 135 arranged in two line, the puller heads and the retriever heads may be arranged in a line. Further, although the broaching device 100 has the puller heads 132 and 134 and the retriever heads 133 and 135 respectively capable of holding two broaches 115, the number of the broaches may be one, or three or more.

Further, although the above-described embodiment has been described such that a tube support plate of a steam generator is machined by a broaching device, the member to be machined is not limited to the tube support plate.

INDUSTRIAL APPLICABILITY

The broaching device according to the present invention improves the machining accuracy by synchronizing and moving the puller heads and the retriever heads at a fixed speed by controlling the electric motor, and can be applied to any broaching work.

REFERENCE SIGNS LIST

11 Containment
12 Pressurized water reactor
13 Steam generator
17 Steam turbine
19 High-pressure turbine
20 Low-pressure turbine
21 Generator
41 Trunk body
45 Tube plate
46 Tube support plate (member to be machined)
46a Prepared hole
46b Mounting hole
44 Tube bundle shroud
48 Heat transfer tube
49 Heat transfer tube bundle
100 Broaching device
111 and 112 Broaching machine
113 and 114 Manipulator (broach moving device)
115 Gantry
116 Broach
117 Control device
132 and 134 Puller head
133 and 135 Retriever head
136 and 140 Main motor (first electric motor)
138 and 142 Sub motor (second electric motor)
144, 145, 146, 147 Rotation speed sensor
151 and 152 Clamp device
172 Broach detection sensor

The invention claimed is:

1. A broaching device comprising:
a puller head adapted to hold a tip portion of a broach, and supported in a horizontally movable manner;
a first electric motor capable of moving the puller head;
a retriever head adapted to hold a base end portion of the broach, and supported in a horizontally movable manner;
a second electric motor capable of moving the retriever head;
a first rotation speed sensor adapted to detect a rotation speed of the first electric motor and a second rotation speed sensor adapted to detect a rotation speed of the second electric motor; and
a control device adapted to enable the puller head and the retriever head to be synchronized with each other and to move at a fixed speed by controlling the rotation speeds of the first electric motor and the second electric motor to be a fixed rotation speed based on a detection result of the first rotation speed sensor and the second rotation speed sensor.

2. The broaching device according to claim 1, wherein, when holding of the broach by the retriever head is released at a predetermined machining stage by the broach associated with movement of the puller head and the retriever head, the control device stops the movement of the retriever head by controlling the second electric motor.

3. The broaching device according to claim 1, wherein
the puller head includes a first puller head and a second puller head,
the retriever head includes a first retriever head and a second retriever head,
the first puller head and the first retriever head are arranged on a straight line,
the second puller head and the second retriever head are arranged on a straight line,
the second retriever head is arranged adjacent to the first puller head,
a broach moving device capable of delivering the broach between the first puller head and the second puller head by turning the broach by 180 degrees in a horizontal direction is provided, and
the broach moving device includes a holding claw capable of holding the broach and a broach detection sensor adapted to detect holding of the broach by the holding claw.

4. A method for broaching using the broaching device of claim 1 comprising:
holding the tip portion of the broach, and supporting in a horizontally movable manner by using the puller head;
moving the puller head by using the first electric motor;
holding the base end portion of the broach, and supporting in a horizontally movable manner by using the retriever head;
moving the retriever head by using the second electric motor; and
synchronizing the puller head and the retriever head each other and moving at a fixed speed by controlling the first electric motor and the second electric motor by using the control device.

5. The method for broaching according to claim 4 further comprising:
detecting a rotation speed of the first electric motor by using the first rotation speed sensor and detecting a rotation speed of the second electric motor by using the second rotation speed sensor, wherein
the control device controls the rotation speeds of the first electric motor and the second electric motor to be a fixed rotation speed based on a detection result of the first rotation speed sensor and the second rotation speed sensor.

6. The method for broaching according to claim 4, wherein, when holding of the broach by the retriever head is released at a predetermined machining stage by the broach associated with movement of the puller head and the retriever head, the control device stops the movement of the retriever head by controlling the second electric motor.

7. The method for broaching according to claim 4, further comprising
supporting a member to be machined between the puller head and the retriever head by using a clamp device, wherein
the clamp device includes a pair of upper and lower support members adapted to support at least one side of an upper portion and a lower portion of prepared holes machined by the broach from one side of the member to be machined, and a pair of upper and lower support pins adapted to be inserted into and support prepared holes at the upper portion and the lower portion of prepared holes machined by the broach from the other side of the member to be machined.

8. The method for broaching according to claim 4, wherein
the puller head includes a first puller head and a second puller head,
the retriever head includes a first retriever head and a second retriever head
the first puller head and the first retriever head are arranged on a straight line,
the second puller head and the second retriever head are arranged on a straight line,
the second retriever head is arranged adjacent to the first puller head,
a broach moving device capable of delivering the broach between the first puller head and the second puller head by turning the broach by 180 degrees in a horizontal direction is provided, and
the broach moving device includes a holding claw capable of holding the broach and a broach detection sensor adapted to detect holding of the broach by the holding claw.

9. A broaching device comprising:
a puller head adapted to hold a tip portion of a broach, and supported in a horizontally movable manner;
a first electric motor capable of moving the puller head;
a retriever head adapted to hold a base end portion of the broach, and supported in a horizontally movable manner;
a second electric motor capable of moving the retriever head; and
a control device adapted to enable the puller head and the retriever head to be synchronized with each other and to move at a fixed speed by controlling the first electric motor and the second electric motor; and
a clamp device adapted to support a member to be machined between the puller head and the retriever head,
wherein the clamp device includes a pair of upper and lower support members adapted to support at least one side of an upper portion and a lower portion of prepared holes machined by the broach from one side of the member to be machined, and a pair of upper and lower support pins adapted to be inserted into and support prepared holes at the upper portion and the lower portion of prepared holes machined by the broach from the other side of the member to be machined.

* * * * *